June 23, 1970     R. F. LEECH     3,516,150

METHOD OF MANUFACTURING SOLID ELECTROLYTIC CAPACITORS

Filed Feb. 21, 1968

Inventor
RONALD F. LEECH
By
Attorney

United States Patent Office 3,516,150
Patented June 23, 1970

3,516,150
METHOD OF MANUFACTURING SOLID ELECTROLYTIC CAPACITORS
Ronald Francis Leech, Paignton, South Devon, England, assignor to International Standard Electric Corporation, New York, N.Y., a corporation of Delaware
Filed Feb. 21, 1968, Ser. No. 707,057
Claims priority, application Great Britain, Mar. 17, 1967, 12,664/67
Int. Cl. H01g 13/00
U.S. Cl. 29—570   6 Claims

ABSTRACT OF THE DISCLOSURE

Electrical components having flat porous electrodes such as tantalum electrolytic capacitors with flat porous anodes are cut from a sintered sheet of powder which can be bent into various shapes. Lead wires are clinched into a hole in the body of the anode, spot welded to the anode surface and then the anode and attached lead wire are sintered.

BACKGROUND OF THE INVENTION

The invention relates to electrical components having a porous metal electrode, and has application to solid electrolytic capacitors.

At present, in the manufacture of solid electrolytic capacitors, the anodes therefor are made by compacting a mass of powdered valve metal, usually tantalum, in a die and sintering the compacted mass to provide an individual anode. This method, unless expensive duplication of dies is undertaken, does not allow more than one anode to be made at a time; nor does it, without special dies, allow the manufacture of unusually shaped anodes for special applications.

SUMMARY OF THE INVENTION

According to a first aspect of the present invention there is provided an electrical component having a porous electrode of metal, which electrode is cut from a sintered sheet of the compacted metal powder.

More particularly the invention provides a solid tantalum electrolytic capacitor having a flat porous anode cut from a sintered sheet of compacted tantalum powder.

In the manufacture of a solid tantalum electrolytic capacitor the invention provides the method including the steps of the method of manufacture of a solid tantalum electrolytic capacitor including the steps of compacting and sintering a mass of tantalum powder into a porous sheet, cutting a portion from the sheet to serve as an anode for the capacitor, attaching a lead wire of tantalum or other suitable valve metal to the anode, electrolytically forming a dielectric oxide film on the outer and substantially all the interior surfaces of the anode and on at least that portion of the lead wire contacting and immediately adjacent the anode, repeatedly impregnating the anode with a solution of manganous nitrate and heating the impregnated anode until a layer of manganese dioxide is formed in intimate contact only with the dielectric film, applying a graphite layer to the layer of manganese dioxide, coating the graphite layer with a silver layer, and joining a cathode connection to the silver layer.

BRIEF DESCRIPTION OF THE DRAWINGS

The invention will further be described with reference to the accompanying drawings in which.

DESCRIPTION OF THE PREFERRED EMBODIMENTS

Figure 1:
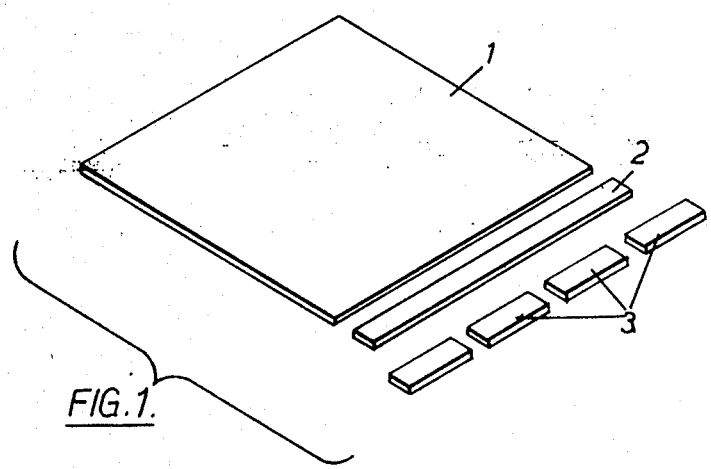
FIG. 1 illustrates the manufacture of anodes for solid tantalum capacitors.

In FIG. 1, sintered sheet 1 of compacted tantalum powder is cropped into strips 2, and each strip is then cropped to give individual tantalum anodes 3. The sheet 1 may be fully sintered or partially sintered, but in the latter case the sheet must be sintered sufficiently to allow subsequent cutting and, if necessary, bending of anodes cut from the sheet as described below. The sheet 1 need not be cropped as shown to give a number of similar anodes; individual anodes of any size may be cut from a stock sheet as required.

Figure 2:
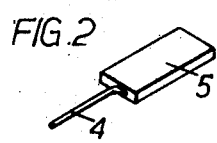
FIGS. 2, 3 and 4 illustrate methods of attaching a lead wire to such an anode.
Figure 3:
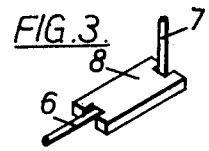
Figure 4:
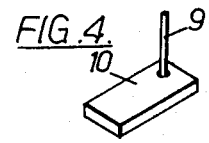

FIGS. 2, 3 and 4, which show several methods by which a lead wire may be electrically connected to an anode made by the method illustrated in FIG. 1, illustrate respectively a tantalum wire 4 spot welded to the surface of a tantalum anode 5, tantalum wires 6, 7 clinched into a slot in the edge of a tantalum anode 8, and a tantalum wire 9 clinched into a hole in the body of a tantalum anode 10. In the method shown in FIG. 2, is preferable to spot weld the tantalum wire to a partially sintered anode, and then to fully sinter the anode with the wire attached. This second sintering operation will drive out some of the impurities which may have entered the tantalum anode and wire from the electrodes of the spot welder. In the methods of FIGS. 3 and 4 the anode may be either fully or partially sintered, since negligible impurity will enter the tantalum anode or wire by these methods. In the methods illustrated in FIGS. 2, 3 and 4 of the metal of the lead wire is not restricted to tantalum. However, for solid tantalum capacitors a tantalum lead wire is preferred, but a lead wire of other valve metal is suitable for these capacitors provided that if the anode is fully sintered after attaching the wire, it is necessary that the valve metal of the lead wire have a sufficiently high melting point not to melt at the sintering temperature.

Figure 5:
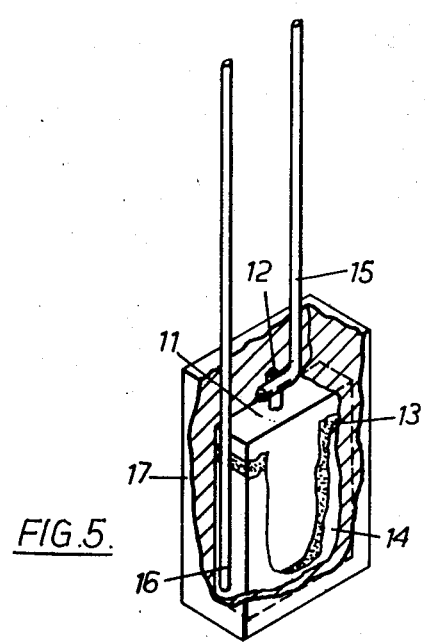
FIG. 5 illustrates a solid tantalum capacitor having such an anode.

In FIG. 5, a solid tantalum electrolytic capacitor has an anode 11 made by the method illustrated in FIG. 1 and has an anode lead wire 12 attached thereto by any of the methods illustrated in FIGS. 2, 3 and 4. This lead wire is preferably tantalum but, as mentioned in the preceding paragraph, may be of other suitable valve metal. A dielectric film of tantalum pentoxide is grown on the outer and substantially all the interior surfaces of the anode and on at least that portion of the lead wire contacting and immediately adjacent the capacitor anode by electrolytic forming. Intimate contact is established with this film by filling the pores and the exterior surface of the anode with manganese dioxide, formed in a known manner by heating an impregnated manganous nitrate solution. The steps of impregnating and heating of the nitrate solution may have to be repeated until all the pores are filled. The reason for forming a dielectric oxide layer on the lead wire as described above is to prevent a possible short circuit between the manganese dioxide layer and the bare anode wire.

Next, the anode is dip coated first with a graphite suspension layer 13 and then after drying with a layer of silver 14. These coatings are to establish a low resistance contact with the manganese dioxide layer and provide for a soldered connection.

A nickel connector 15 is welded to the anode wire 12 and a cathode wire 16 is soldered to the silver layer.

Finally, a resin casing 17 is either cast or moulded around the capacitor unit.

Figure 6:
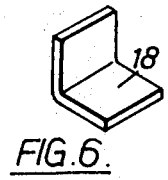
FIGS. 6 and 7 illustrate unusually shaped porous valve metal electrodes for electrical components having special applications.
Figure 7:
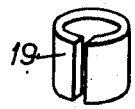

FIGS. 6 and 7 show, respectively, an angled electrode 18 and a cylindrical electrode 19 both formed by bending a strip cut from a sheet of fully sintered or partially sintered metal.

While I have described the above principles of my invention in connection with specific embodiments, it is to be clearly understood that the description is made by way of example only and not as a limitation to the scope of my invention as set forth in the accompanying claims.

I claim:

1. The method of manufacture of a solid tantalum electrolytic capacitor comprising the steps of:
   compacting and sintering a mass of tantalum powder into a porous sheet;
   cutting a portion from said sheet to serve as an anode for said capacitor;
   attaching a lead wire of valve metal to said anode;
   electrolytically forming a dielectric oxide film on the outer and substantially all the interior surfaces of said anode and on at least that portion of the lead wire contacting and immediately adjacent the anode;
   repeatedly impregnating said anode with a solution of manganous nitrate and heating said impregnated anode until a layer of manganese dioxide is formed in intimate contact only with said dielectric film;
   and applying a cathode connection on said manganese dioxide layer.

2. The method as claimed in claim 1, wherein said lead wire is clinched into a slot at the edge of the anode.

3. The method as claimed in claim 1, wherein said lead wire is clinched into a hole in the body of the anode.

4. The method as claimed in claim 1, wherein said sheet of compacted tantalum powder is only partially sintered, said lead wire is spot-welded to the anode, and said anode with lead wire attached is then fully sintered.

5. The method as claimed in claim 1 wherein said lead wire is tantalum.

6. The method as claimed in claim 1 further comprising the steps of:
   applying a graphite layer to said manganese dioxide; and
   coating said graphite layer with a silver layer forming said cathode connection.

References Cited

UNITED STATES PATENTS

| | | | |
|---|---|---|---|
| 2,299,228 | 10/1942 | Gray et al. | 317—230 |
| 2,359,970 | 10/1944 | Clark | 317—230 |
| 2,758,258 | 8/1956 | Bliss et al. | 317—230 |
| 3,166,693 | 1/1965 | Haring et al. | 317—230 |
| 3,345,545 | 10/1967 | Baurgault et al. | 317—230 |
| 3,375,413 | 3/1968 | Brill | 317—230 |

JAMES D. KALLAM, Primary Examiner

U.S. Cl. X.R.

317—230; 29—420.5, 25.42